Patented June 30, 1936

2,046,091

UNITED STATES PATENT OFFICE 2,046,091

PAINT

Albert George Rodwell, Dalston, London, England

No Drawing. Application February 6, 1934, Serial No. 709,999. In Great Britain February 20, 1933

3 Claims. (Cl. 134—54)

This invention relates to paints for coating wood and other surfaces.

It is known that rubber latices cannot ordinarily be mixed satisfactorily with alkali silicate solutions such as are often contained in paints, owing to the fact that the latex floats to the surface after a time; if the latex is stirred in and the paint used with a brush, the latex coagulates on the brush.

It is an object of the present invention to provide paints wherein there is a satisfactory vehicle containing rubber latex and alkali silicate solution.

I have found that the use of gelatinous silica (that is the gelatinous material formed for example by the precipitation of waterglass with a mineral acid) with rubber latices permits of the latter being successfully mixed with alkali silicate solutions. In accordance with the present invention therefore a paint is formed by the addition of pigment to a vehicle made by mixing gelatinous silica with a rubber latex solution and adding it to a solution of an alkali silicate. It is essential that the gelatinous silica should be separately prepared preparatory to admixture with the latex solution in order that undesirable acid reactions due to the acid employed for the precipitation of the gel, as well as the presence of free acid in the mix, may be avoided.

Paint in accordance with the invention combines the advantages of noninflammability and considerable resistance to heat, common to silicate paints, with the advantages of flexibility, greater adhesive power and less chemical attack on surfaces such as plaster and cement.

To make the improved paint a suitable vehicle may be made by mixing 50 lbs. of gelatinous silica with 50 lbs. of a latex solution, comprising 25 lbs. of latex and 25 lbs. of water, all the materials being in the cold; the resulting mixture is then broken down with an alkali silicate to any required percentage. In this instance it has been assumed that use is made of a latex containing approximately 70% of rubber.

In the mixture, the percentage of either gelatinous silica or of latex solution may vary between the limits of 33% to 66%; and the water in the latex solution may be replaced by a solution of borax or other alkali.

The alkali silicates used should be from 40° to 90° Twaddell according to the ratio of silica to alkali in the silicate solutions and the absorption power of the filler to be used. Intimate mixture is found to take place immediately, and the vehicle is then ready for the addition of pigment.

The proportion of vehicle to filler varies considerably depending upon whether mineral or metal fillers (or pigments) are employed. For instance, in the case of lithopone paints, 8 lbs. of lithopone are added to 160 fluid ounces of vehicle comprising 140 fluid ounces of silicate solution of 55° Twaddell and 20 fluid ounces of the gelatinous silica-latex solution mixture; whereas, in the case of a metal filler, 1½ lbs. of aluminium powder are added to 160 fluid ounces of the vehicle, in this case comprising 150 fluid ounces of silicate solution of 45° to 50° Twaddell and 10 fluid ounces of the gelatinous silica-latex solution mixture.

Other pigments or fillers may of course be employed with appropriate choice of silicate solution density within the range stated and in such proportionate quantities as to give the desired consistency.

I claim:—

1. A method of preparing a stable binder mixture for pigments, consisting in first combining gelatinous silica and latex solution and then adding to the mixture a solution of alkali silicate.

2. A method of preparing a stable binder mixture for pigments, consisting in preparing gelatinous silica, preparing a solution of rubber latex in alkali, mixing the gelatinous silica with the latex solution, and then adding a solution of alkaline silicate to the resultant mixture.

3. A method of preparing a stable binder mixture for pigments, consisting in combining gelatinous silica and a solution of rubber latex in borax, and then adding a solution of an alkaline silicate.

ALBERT GEORGE RODWELL.